United States Patent [19]

Rysti

[11] 4,067,455
[45] Jan. 10, 1978

[54] STACKING PLANT AND METHOD

[76] Inventor: Alpo Rysti, Frisansintie 22, 02240 Espoo 24, Finland

[21] Appl. No.: 688,727

[22] Filed: May 21, 1976

[30] Foreign Application Priority Data

Mar. 10, 1976 Finland .................................. 760624

[51] Int. Cl.² ............................................. B65G 57/06
[52] U.S. Cl. .................................. 214/6 H; 198/374; 214/6 M
[58] Field of Search .................. 214/6 H, 6 M, 6 DK; 198/374, 420

[56] References Cited

U.S. PATENT DOCUMENTS

| 3,738,510 | 6/1973 | Mason | 214/6 M |
| 3,823,834 | 7/1974 | Rysti | 214/6 M |
| 3,860,128 | 1/1975 | Lunden | 214/6 M |

FOREIGN PATENT DOCUMENTS

| 246,042 | 3/1966 | Austria | 214/6 M |
| 104,163 | 6/1964 | Norway | 214/6 M |
| 211,393 | 4/1968 | U.S.S.R. | 214/6 M |

Primary Examiner—Robert J. Spar
Assistant Examiner—Ross Weaver
Attorney, Agent, or Firm—Steinberg & Blake

[57] ABSTRACT

A stacking plant and method for stacking elongated bodies such as timber bodies in layers situated one above the other wherein all of the bodies of all of the layers are substantially parallel to each other with adjoining layers being separated by at least a pair of laths which extend crosswise of the bodies. A body-handling apparatus is arranged so as to extend along a first location while a lath-handling apparatus is arranged so as to extend along a second location part of which extends across the first location, both of these apparatus being operated in such a way that the body-handling apparatus sequentially forms at the intersecting parts of the locations layers of the bodies while the lath-handling apparatus deposits on each layer at the intersecting parts of the locations at least a pair of laths after each layer is formed and before the next layer is deposited on the laths situated on the preceding layer by the body-handling apparatus. The above first and second locations have elongated portions which extend in the same general direction and between which there is located at a third location a station for a single operator who can control both the body-handling apparatus and the lath-handling apparatus while having a good visibility of all of the operations.

12 Claims, 4 Drawing Figures

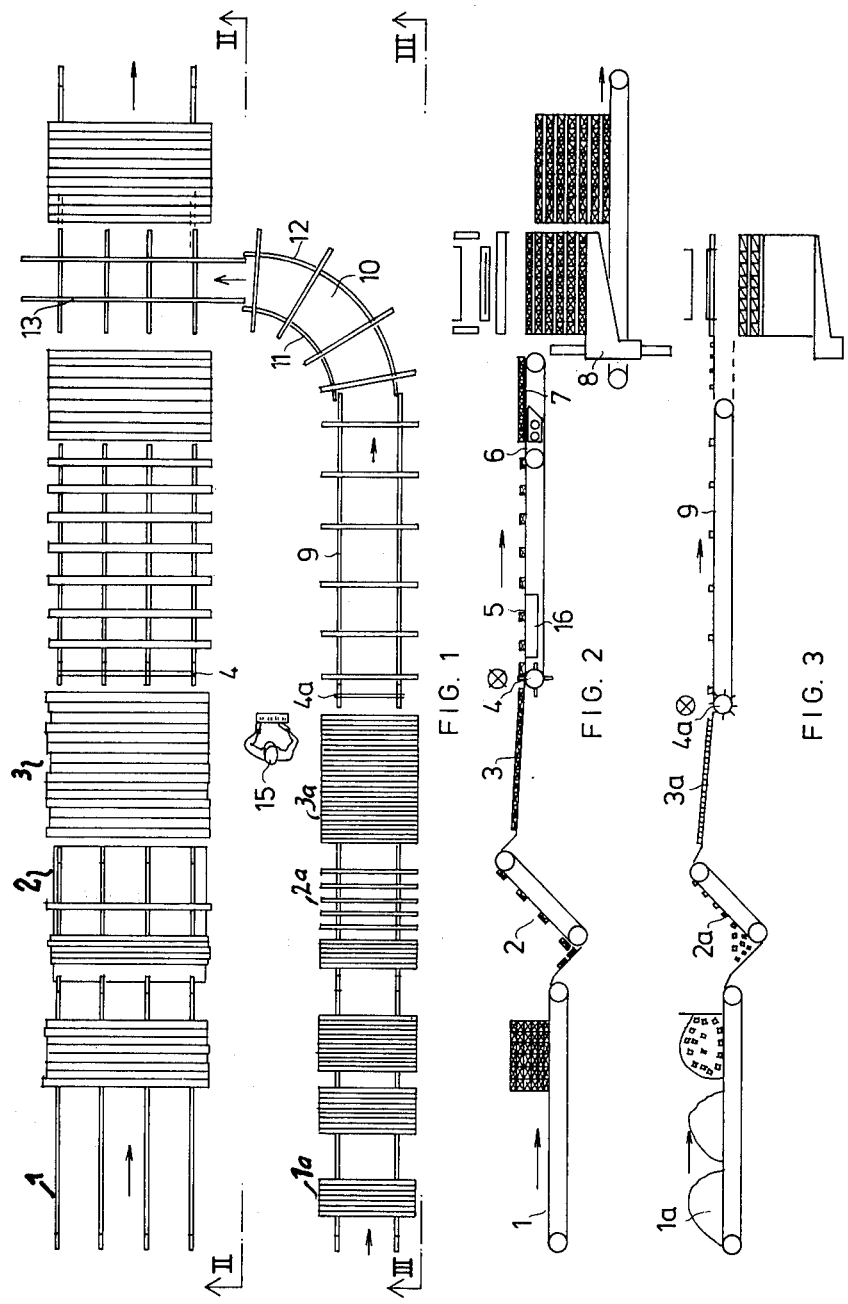

STACKING PLANT AND METHOD

BACKGROUND OF THE INVENTION

The present invention relates to a plant and method for producing stacks of bodies such as timber bodies. A body-handling apparatus handles the timber bodies while a lath-handling apparatus handles the laths and these two apparatus operate in such a way that after a layer of bodies is formed by the body-handling apparatus at least a pair of laths are deposited on this layer and the next layer of bodies is deposited on these laths, and so on. In this way it is possible to form stacks of the bodies, such as timber bodies, wherein they are arranged in layers which are spaced from each other by the laths situated between the layers. Such arrangements are particularly suitable for drying timber.

Thus, in modern sawmill installations, one of the most important manufacturing stages involves the arrangement of elongated timber bodies in stacks suitable for drying. For this purpose the timber bodies are arranged in layers separated from each other by intermediate laths, these laths having a predetermined size and length depending upon the particular drying method and the size of the stack which is to be dried.

At the present time, machines which form stacks of the above type have several different constructions. However, the operations carried out by all of these known machines require a staff of at least two or even more individuals. For example, in the case of a two-person staff, one man will control the feeding of the timber bodies while the other will control the laying of the laths on each layer prior to situating the next layer of timber bodies on the previously deposited laths.

Inasmuch as the conventional apparatus of the above type is extremely expensive and inasmuch as the operations require at least two or more individuals, the operating costs for the conventional installations are undesirably high.

For the above reasons, a considerable effort has been made over a long period of time to develop a method and plant according to which only a single individual would be required for all of the operations in connection with forming stacks of the above type. Thus, there have been efforts to solve the problem, for example, in such a way that the same individual will periodically fill a so-called lath magazine, but the result is that the machine becomes only a periodically operating machine and the output is undesirably reduced.

SUMMARY OF THE INVENTION

It is accordingly a primary object of the present invention to provide a plant and method according to which it becomes possible to avoid the above drawbacks.

In particular, it is an object of the present invention to provide a plant and method according to which only one individual is required to control all of the stages of the operations of all of the apparatus required to form stacks of the above type.

A further object of the present invention is to provide a plant and method according to which even though a single individual controls all parts of all of the operations, nevertheless the output of the apparatus of the invention is not diminished as compared to the output of conventional apparatus.

Yet another object of the present invention is to provide a plant and method according to which the apparatus for handling the timber bodies and the apparatus for handling the laths are situated at such locations with respect to each other that all of the operating stages with respect to feeding and stacking of the timber bodies and feeding and distributing the intermediate laths are capable of being situated under the visual control of a single person.

Furthermore it is an object of the present invention to provide a plant and method according to which the feeding of the timber bodies and the feeding and distribution of the intermediate laths are scheduled with respect to each other in such a way that a single operator is able to control all of the operating stages visually and in addition, if necessary, to take concrete measures for eliminating any failures in the feeding and stacking of the timber as well as in the feeding and distribution and depositing of the laths.

Thus, the plant and method of the present invention relate to the arranging elongated bodies, such as timber bodies, in a stack wherein all of the bodies are substantially parallel to each other and respectively situated in several layers situated one above the other with at least two laths situated between each pair of adjoining layers of the elongated bodies, extending crosswise thereof and maintaining a space between the adjoining layers. Situated along a first location is a body-handling apparatus which is operated to form from the bodies, sequentially, a series of layers thereof situated one above the other. At a second location which in part extends across a part of the first location there is a lath-handling apparatus which is operated to situate on each layer of the bodies formed by the body-handling apparatus, before the next layer is situated thereover, at least a pair of laths spaced from each other and extending across the bodies of each layer, the next layer of the bodies then being deposited by the body-handling apparatus on the laths situated on the preceding layer of the bodies by the lath-handling apparatus. All of the above operations are controlled by a single individual situated at a third location from which the first and second locations are conveniently visible.

BRIEF DESCRIPTION OF DRAWINGS

The invention is illustrated by way of example in the accompanying drawings which form part of this application and in which:

FIG. 1 is a schematic top plan view of one possible layout of a plant according to the invention for carrying out the method of the invention;

FIG. 2 is a schematic sectional elevation of the body-handling apparatus of the plant of FIG. 1, FIG. 2 being taken along line II—II of FIG. 1 in the direction of the arrow;

FIG. 3 is a schematic elevation of the lath-handling apparatus of the plant of FIG. 1, FIG. 3 being taken along line III—III of FIG. 1 in the direction of the arrow.

DESCRIPTION OF PREFERRED EMBODIMENTS

Figure 4:
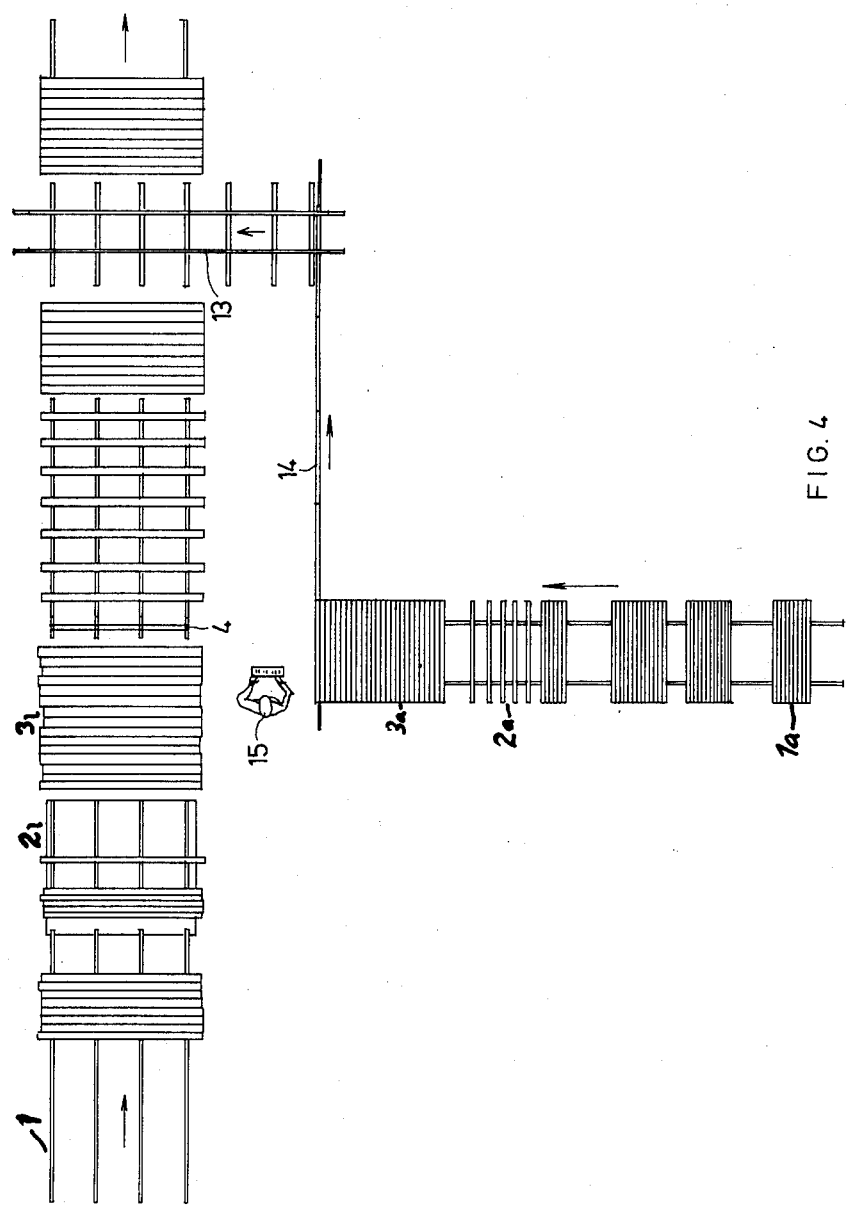
FIG. 4 is a schematic top plan view of a layout of another embodiment of a plant according to the invention also for carrying out another embodiment of a method according to the invention.

Referring first to FIGS. 1-3, the body-handling apparatus for handling timber bodies includes a conveyer means 1 at which a relatively large number of timber bodies are stored in such a way that they can be conveyed to the right, as shown by the arrow at the upper left of FIG. 1, toward a body conveyer 2 which receives the elongated timber bodies one by one from the storage conveyor 1 and which conveys these timber bodies upwardly toward the right, as viewed in FIG. 2. In much the same way, the lath-handling apparatus includes a storage conveyer 1a capable of storing and conveying relatively large numbers of laths which are fed from the storage conveyer 1a one by one to the lath conveyer 2a which carries the laths upwardly toward the right, as viewed in FIG. 3. Essentially, these conveyers 1 and 1a form the lower portions of magazines in which the timber bodies and laths are respectively located and out of which they are moved one by one relatively rapidly to the conveyers 2 and 2a, as is apparent from FIGS. 1–3.

Thus, the several timber bodies are separated from each other when traveling from the storage conveyer 1 to the conveyor 2 while the several laths are separated from each other when traveling from the storage conveyer 1a to the conveyor 2a. The conveyer 2 delivers the elongated timber bodies to a feeding conveyer 3 while the laths are fed from the conveyer 2a to a feeding conveyor 3a. These feeding conveyers 3 and 3a may take the form of stationary units each of which is inclined slightly downwardly toward the right, as viewed in FIGS. 2 and 3, with each of these units having a series of closely spaced freely rotatable rollers on which the timber bodies or laths are capable of rolling gravitationally downwardly toward the right as viewed in FIGS. 2 and 3.

From the rollers of the feeding conveyer 3 of the body-handling apparatus, the several bodies are received by a rotary proportioner 4 which serves to space the bodies from each other while delivering them to a distributing conveyer 5. The single-proportioner 4 may have a construction as shown, for example, in Finnish Pat. No. 48,569. The distributing conveyer 5 although shown schematically as a simple belt conveyer may take the form of a conveyer having a plurality of rollers which form nips between themselves with each timber body being fed one at a time to each roll nip. It will be seen that the several bodies are transported by the body handling apparatus along the elongated location extending from left to right, as viewed in FIGS. 1 and 2, where the body-handling apparatus is located, with the bodies extending transversely to the direction of travel thereof along the elongated location of the body-handling apparatus. At the distributing conveyer 5 there is a unit 16 including a plurality of rollers which serve to straighten any of the bodies which happen to be inclined with respect to the desired direction thereof so that by way of the unit 16 it is assured that the several timber bodies will extend precisely perpendicularly to their direction of travel.

It is also possible to provide after the rollers of the unit 16 additional rollers which are not illustrated but which serve to provide an arrangement according to which alternate bodies are distributed to one side only of the distributing conveyer 5 so that by feeding the bodies one to one side and one to the other side of the distributing conveyer 5 it is possible to simultaneously form a pair of layers respectively situated beside each other.

The distributing conveyer 5 transports the timber bodies to a collecting conveyer 6 which is adjustable with respect to the speed of operation thereof so as to control the velocity of transportation of the bodies and thus situate the several timber bodies either at a given spacing from each other or directly next to each other as desired. After a layer of timber bodies of a predetermined width has been formed on the collecting conveyer 6, a signal is automatically given to the unit 7 which includes feed levers which shift the entire timber layer to a lift 8, the elevation of which can be controlled in a known way, this lift 8 having a construction as shown, for example, in Finnish Pat. No. 42,188. Thus, the feeding levers 7 will shift an entire layer of the timber bodies to a location situated over the lift 8 to become either the first layer carried thereby or a further layer carried thereby over a previously deposited layer, and then the levers 7 return to their initial position in preparation for shifting the next layer onto the stack. After the lift 8 receives a layer of timber bodies it is automatically moved downwardly through a distance corresponding to the depth occupied by a timber layer and the laths thereon.

Referring now to the lath-handling apparatus, the proportioner 4a thereof operates in much the same way as the proportioner 4 of the body-handling apparatus and serves to receive the laths from the rollers of the feeding conveyer 3a and to distribute these laths at a given distance from each other to the distributing conveyer 9. Thus, the lath proportioner 4a distributes the laths one by one to the distributing conveyer 9, which, although shown as a simple belt conveyer, also may have the form of rollers which cooperate to form between themselves nips with one lath being fed to each roll nip. The distributing conveyor 9 on the lath-handling apparatus is followed by a synchronized conveyer 10 which receives the several laths from the distributing conveyer 9 and changes the direction of travel of these laths so that they extend perpendicularly with respect to the timber bodies. The synchronized conveyer 10 includes conveyer chains 11 and 12 which are arranged respectively along the concentric 90° curves as illustrated in FIG. 1, with the chain 11 traveling at a slower speed than the chain 12, or if rollers are provided the conveyer portion 11 has a shorter roll nip while the chain 12 if replaced by rollers is provided at these rollers with a longer roll nip. Thus, by way of this part of the lath-handling apparatus the intermediate laths will be turned through 90°.

The synchronized conveyer 10 delivers the several laths one after the other to a depositing conveyer 13 having, for example, a pair of endless chains from which hooks depend in such a way that these hooks will engage beneath the successive laths and carry them to a location over the layer of bodies which has just been formed by the body-handling apparatus, with the conveyer 13 then being actuated so that the hooks tilt to release the laths so that they will become deposited on the previously formed layer of timber bodies extending crosswise thereof. Then the next layer of timber bodies is deposited on the previously deposited laths by the lever 7, set forth above, and so on, so that in this way a stack is formed on the lift 8. The depositing conveyer 13 may have a construction as shown in Finnish Pat. No. 46,247. Thus it will be seen that the body-handling apparatus extends along a first location while the lath-handling apparatus extends along a second location which intersects part of the first location, at the place where the depositing conveyer 13 is situated, with both the body-handling apparatus and the lath-handling apparatus having elongated portions which extend in the same general direction, parallel to each other as indicated in FIG. 1, while the location for the lath-handling apparatus has at one end of its elongated portion parallel to the body-handling apparatus a transverse portion including the synchronized conveyer 10 and the depositing conveyer 13, this transverse portion of course extending perpendicularly across a part of the location of the body-handling apparatus.

According to a further feature of the invention, between the pair of elongated portions of the locations of the body-handling apparatus and lath-handling apparatus which extend in the same general direction there is a third location where the individual 15 is located. This individual 15 has a control station at a suitable control pulpit or panel from where this one individual 15 is capable of controlling all of the above operations. Thus, at the third location for the individual 15 it is possible for this one individual to easily view the entire operations and to take whatever steps, if any, might be necessary to correct any faults which are noted such as a faulty position of a given lath or a faulty position of a given timber body. Thus with the invention a single person is able to control visually from the control board the several stages of the feeding, distributing and stacking of the timber bodies as well as the several stages of the feeding, distributing and depositing of the intermediate laths, while being able to take concrete measures for eliminating possible failures, if necessary.

As is apparent from FIG. 2 in particular, the lift 8 will eventually reach a lower position where the completed stack will be deposited on a further conveyer to be transported thereby to a location where, for example, the elongated bodies are dried.

According to the embodiment of the invention which is illustrated in FIG. 4, the body-handling apparatus for handling the timber bodies is identical with that of FIGS. 1 and 2. However, the lath-handling apparatus is of a different arrangement and operates differently in that the laths of the embodiment of FIG. 4 are arranged at all times perpendicular to the timber bodies. Thus it becomes unnecessary with the embodiment of FIG. 4 to provide a turning arrangement as provided by the synchronized conveyer 10 of FIGS. 1–3.

With the embodiment of FIG. 4, the location along which the storage conveyer 1a, the upwardly inclined conveyer 2a, and the feeding conveyer 3a of the lath-handling apparatus is located extends perpendicularly with respect to the location along which the body-handling apparatus is located. However, this part of the structure up to and through the feeding conveyer 3a of FIG. 4 is identical with that of FIGS. 1–3. At the end of the feeding conveyer 3a of FIG. 4, however, instead of a proportioner 4a as shown in FIG. 3, there is a proportioner 14 in the form of a suitable chain having thereon conveying elements situated at fixed distances from each other, these conveying elements projecting from the chain in such a way that each projecting element will engage the left end of a lath at the end of the feeding conveyer 3a, to transport this end lath in the direction of its own length along a location portion which is parallel to the location along which the body-handling apparatus is situated. Thus it will be seen that the conveyer 14 extends along a portion of the location of the lath-handling apparatus which is parallel to the body-handling apparatus, and at this portion of the location of the lath-handling apparatus the conveyer 14 conveys the laths substantially in end-to-end relation toward the depositing conveyer 13. Thus in this embodiment the proportioner 14 delivers the laths one by one to the depositing conveyer 13 the operation of which is synchronized with the operation of the proportioner 14 so that the hooks of the conveyer 13 will successively engage the successive laths to catch the latter and transport them over the previously formed layer of timber bodies and then deposit the laths on the timber bodies in the manner described above.

With the above embodiments of the invention, it will be noted that the third location for the individual 15 is situated substantially centrally with respect to the elongated portions of the locations of the body-handling apparatus and lath-handling apparatus, between both of the latter apparatus at a substantial distance from the depositing conveyer 13 where the body-handling apparatus and lath-handling apparatus meet. Thus it will be seen that the location for the individual 15 is such that the individual is situated substantially midway between the opposed ends of the elongated portion of the location of the body-handling apparatus and the elongated portion of the lath-handling apparatus, so that with this particular arrangement not only does the operator have a good visibility of the entire operations, so that a highly effective visual control is achieved, but in addition because of this central location for the individual 15, this individual may have quick, rapid access to any part of the entire installation for effectively correcting any faults which may arise in the shortest possible time.

The plant and method of the invention are applicable to all types of apparatus for forming stacks of timber bodies arranged in layers separate from each other by laths, even for that type of apparatus where each layer of timber bodies is directly formed on the feeding conveyer 3 from which the feed levers 7 directly move each layer onto the lift 8. In such a construction and method there is no proportioner 4 and the conveyers 5 and 6 also are eliminated. The operator 15 controls in this case the formation of each timber body layer on the feeding conveyer 3.

If the stack of timber bodies is sufficiently narrow, all of the several conveyers for the timber bodies will be correspondingly shorter and thus the laths will be shorter so that the conveyer 14 also will be shorter or it may be completely omitted in an arrangement where the laths can be fed directly from the conveyer 3a to the depositing conveyer 13 with the operator 15 being capable of controlling both the formation of the timber layers and the distribution of the intermediate laths.

Instead of a feeding conveyer 3a for the laths, it is also possible to use a suitable magazine in which the laths are stored in a stack and from which the laths are fed one by one directly to the depositing conveyer 13.

While only two different modifications of the plant and method of the invention are described above and illustrated, it is clear that the details of the invention can vary considerably within the limits of the inventive concept set forth in the claims which follow.

What is claimed is:

1. In a method for arranging elongated bodies, such as timber bodies, in a stack wherein all of the bodies are substantially parallel to each other and respectively situated in several layers situated one above the other with at least two laths situated between each pair adjoining layers of said elongated bodies, extending crosswise thereof and maintaining a space between the adjoining layers, the steps of operating at a first elongated location a body-handling apparatus which has opposed ends and sequentially forms from said bodies a series of layers thereof situated one above the other, operating at a second elongated location which in part extends across a part of said first location a lath-handling apparatus which situates on each layer of said bodies formed by said body-handling apparatus before the next layer is situated thereon, at least a pair of laths spaced from each other and extending across the bodies of each layer, the next layer of said bodies being deposited by said body-handling apparatus on the laths situated on the preceding layer of said bodies by the lath-handling apparatus, and controlling the operations of said body-handling apparatus and lath-handling apparatus by a single individual situated at a third location spaced at a substantial distance from the crossing parts of said first and second locations, situated substantially midway between said ends of said body handling apparatus and between said first and second locations, and from which said first and second locations are conveniently visible.

2. In a method as recited in claim 1 and including the steps of transporting said bodies with said body-handling apparatus and said laths with said lath-handling apparatus respectively along elongated portions of said first and second locations which extend in the same general direction and between which said third location is situated.

3. In a method as recited in claim 2 and including the steps of advancing the bodies and laths with said body-handling apparatus and lath-handling apparatus, respectively, in the same directions along said elongated portions of said first and second locations, and one of the latter locations having at an end of one of said elongated portions a portion extending transversely with respect to said one elongated portion to the other location to form the parts of the locations which extend across each other, and providing at said third location situated between said elongated portions for the single operator a position according to which said single operator can face said transverse portion.

4. In a method as recited in claim 3 and including the step of situating said lath-handling apparatus along said one location which has said transverse portion.

5. In a method as recited in claim 4 and wherein the laths extend transversely of said elongated portion of said one location and of said transverse portion thereof and including the step of turning said laths through 90° when transferring from said elongated portion to said transverse portion of said one location, and the bodies extending transversely with respect to the elongated portion of said other location along which said body-handling apparatus is situated.

6. In a method as recited in claim 4 and wherein said bodies extend transversely of said elongated portion of said other location, and including the step of maintaining said laths when moving along said one location at said elongated and transverse portions thereof at all times perpendicular to said bodies.

7. In a method as recited in claim 6 and including the step of feeding said laths with said lath-handling apparatus in substantially end-to-end relation along said elongated portion of said one location.

8. In a method as recited in claim 1 and wherein said body-handling apparatus includes a feeding conveyer, and including the step of sequentially forming the several layers of said bodies on said feed conveyer.

9. In a method as recited in claim 1 and wherein said lath-handling apparatus includes an end conveyer, and including the steps of depositing the laths onto a body layer and feeding the laths by way of a feeding conveyer directly to the end conveyer.

10. In a method as recited in claim 2 and including the steps of feeding the bodies and laths respectively with feed conveyers of said body-handling apparatus and said lath-handling apparatus, respectively proportioning, with proportioners, with bodies and laths from said feed conveyers to space a series of bodies and a series of laths from each other by the proportioners, and determining with the proportioner of said lath-handling apparatus the space in between the laths when they are deposited on each layer of bodies.

11. In a method as recited in claim 10 and including the step of collecting the bodies on a collecting conveyer situated immediately after the path travelled by the bodies as proportioned by said proportioner of said body-handling apparatus.

12. In a plant for forming from elongated bodies such as timber bodies and from elongated laths stacks of said bodies wherein the bodies are arranged in several layers situated one above the other with all of the bodies and all of the layers being substantially parallel to each other and with at least a pair of laths situated between each pair of adjoining layers extending crosswise of said bodies to space said layers from each other, elongated body-handling apparatus having opposed ends situated along a first location for forming from a plurality of said bodies at a given part of said first loc action a series of layers of said bodies which are situated sequentially one above the other by said body-handling apparatus, elongated lath-handling apparatus extending along a second location a portion of which extends in the same general direction as a portion of said first location, and one of said locations extending in part across the other at the part of said first location where the layers are sequentially formed by said body-handling apparatus, said lath-handling apparatus depositing at least a pair of laths on each body layer formed by said body-handling apparatus after each layer is formed thereby and before the next layer of said bodies is deposited by said body-handling apparatus on the laths deposited by said lath-handling apparatus on the immediately preceding layer of said bodies, and an operator control station for a single operator situated at a third location between said elongated portions of said first and second locations which extend in the same general direction at a substantial distance from said crossing parts of said locations, substantially midway between said ends of said body-handling apparatus for providing for the single operator control of both the body-handling apparatus and the lath-handling apparatus while at the same time providing for the single operator a good visibility of the operations carried out by both the body-handling apparatus and the lath-handling apparatus.

* * * * *